Patented May 28, 1940

2,202,623

UNITED STATES PATENT OFFICE 2,202,623

THERMOPLASTIC PROTEIN COMPOSITION

Jean Delorme, Aubiere, France, assignor to George Morrell Corporation, Muskegon, Mich., a corporation of Michigan No Drawing. Application December 30, 1937, Serial No. 182,473

3 Claims. (Cl. 260—119)

This invention is for the production of thermoplastic compositions produced by the treatment of proteins, and particularly casein, which is a practical protein and which I have treated in the hereafter described manners.

Fundamentally the treatment consists in subjecting the chosen protein, such as casein, to the action of a halide or sulphate of the aliphatic alcohols as methyl, ethyl, propyl, butyl, etc. In practice the treatment is in connection with and in the presence of alkalis, such as caustic soda or potash, or the carbonates of sodium, potassium or ammonium, or in materials carrying such ingredients, for example, lime, barytes, calcium carbonate, barium carbonate and the like.

When the casein or other equivalent protein has been treated and reacted upon by a halide or sulphate of the aliphatic alcohols and the resulting product of the reactions washed and otherwise purified of any excess of materials greater than is required to complete the reaction and thereafter dried, there is produced a product or composition which is solid at ordinary atmospheric temperatures, which becomes soft at approximately 110° C. and is sufficiently plastic for forming or rolling at approximately 80° C., which may be and preferably is ground into a finely divided form for use in injection molding or for molding into mold cavities under heat and pressure, which is readily reduced to an easily workable plastic form by the treatment thereof with numerous so-called plastifiers and which in plastic form may be rolled and extended into sheets of any desired thinness which sheets after rolling are flexible at ordinary temperatures. The composition produced may be used in various types and characters to increase the bulk, to modify and change the physical appearance and characteristics from the unadulterated product of this invention. The product obtained in effect is similar in many respects to Celluloid and may be availed of in the production of a large quantity of articles analogous to those obtained with cellulosic ethers and esters and the like.

This invention has been reduced to practice by using casein. A practical and concrete example of the process which I employ and which has produced the most satisfactory results is to provide and mix in a containing vessel, 10 kilograms of sulphuric casein; 3.5 kilograms of anhydrous sodium carbonate in powdered form; and 10 liters of denatured alcohol (80 to 85%). These ingredients are thoroughly and homogeneously mixed and then left to stand to act upon each other for a period of approximately 15 hours at a temperature of ordinary atmospheric or room temperature. The time of approximately 15 hours is subject to variation and may be decreased with the use of higher temperatures though the temperature should not be raised above approximately 65 or 70° C. The time of 15 hours is the best time which I have found for the mixture to stand with ordinary conditions of atmospheric temperature and humidity.

After the intermixed ingredients above specified have stood for approximately the time stated, there is added 5 kilograms of ethyl sulphate, for example, gradually stirring it into the mass and after thoroughly intermixing therewith then heating at a temperature ranging between 80° to 90° C. for a period of from 3 to 5 hours. The reaction is complete upon the attainment of a smooth clear liquid which is entirely free of any solid particles, nodules or masses. It may further be noted that instead of first mixing the casein, the alkali carbonate and the alcohol as stated and, after a period of time, introducing the ethyl sulphate and then heating and mixing, all four ingredients may be initially mixed together and left to stand for the period of time, after which the heating to the higher temperature with the simultaneous continuous mixing will be performed.

Under these conditions at the beginning of the reaction the mass of ingredients is slightly alkaline in character but the alkalinity is weak and not sufficiently basic to cause any hydrolysis of the casein protein. At the end of the reaction the composition may be substantially neutral or slightly acidified. After the reaction is complete the product obtained may be cooled and freed of any excess of ethyl sulphate by washing with a solvent thereof such as alcohol, the usual filtering or decanting methods being used to thereafter remove the alcohol, the product then dried. Such product is of a gelatinous character, is solid and may be of a granular form at atmospheric temperatures and can be ground into a desired finely or coarsely divided form as may be preferred. Such final product obtained as described is readily usable in substantially the same manner as many other plastic materials, such as Celluloid and various thermoplastic molding powders and is available for use in the same manners. As a thermoplastic molding powder it may be used for molding by compression or injection. As a Celluloid substitute it may be used for the fabrication of films, caps or closures for receptacles, as the intermediate layer in safety glass, and many other purposes. It is soluble in a great many solvents among which are chlorinated solvents, carbon sulphide, alcohol, cyclohexanol, methylglycol dioxane, esters and ethers, benzaldehyde, furfurol, acrolein, aniline, acetone, methylethyl acetone, mesityl oxide, pyridine, as well as in the formic, acetic, butyric, stearic, oleic acids etc. It is capable of being softened or plastified by a great many compositions for such purpose, including glycerol, bornylacetate, triacetine, ethyl ricinoleate, diethyl phthalate, dibutyl phthalate, ethyl lactate, butyl lactate, triaryl phosphate, acetophenone, fenchone, camphor, diphenylmethylamine, formanilide, acetanilide, methylacetanilide, ethylacetanilide, paratoluenesulfamide, urea, dimethyl-diphenyl urea, ethylurethane, chlorhydrine of glycerin, triethanolamine, ethylenediamine, etc. As a body to receive and carry fillers it is very useful and as fillers there may be used, among other things, the following materials: wood flour, soya-bean meal, asbestos, magnesia, silica, carbon black, graphite, silicates, aluminates, cellulosic fibers, paper pulp, textile scrap, scraps from formaldehyde and hardened casein, or ground synthetic resins, etc., organic and mineral colorings or wood extracts, etc. By itself it is clear and transparent and does not deteriorate or change under the action of water and light.

The above example is for the best process for the production of the product that I have so far discovered. The change in the casein or similar protein to the desired product may be performed specifically in a different manner. As an example in a mixer 8 kilograms of rennet-casein, 6 kilograms of denatured alcohol at 90°, and 3.2 kilograms of ethyl sulphate are thoroughly mixed and heated from 4 to 8 hours at a temperature approximating 80° C., the heating continuing until a completely smooth, viscous fluid is obtained without any solid materials therein, this evidencing that the reaction is complete. The mixer and its contents may then be cooled and 10 liters of cold water added to effectuate and help precipitation of the gelatinous thermoplastic product which is obtained. In this case the reaction begins in a neutral medium but there is a production of some acid, such as H₂SO₄, during the reaction and the acidity is sufficient when approaching the end of the reaction that there are produced violet or brown colorations due to the partial hydrolysis of the protein because of the acid condition. The product therefore is not as satisfactory as in the first described example, but this second example is indicative of the reaction effect of ethyl sulphate or the other alcoholic sulphates stated upon the casein to produce the thermoplastic composition desired.

In the presence of a tanning or hardening agent like formaldehyde, or in using other proteins which have been hardened, for a part or all of the casein or equivalent protein content in the above example, more difficulty is encountered in obtaining the desired products, it appearing that the amine functions, —NH₂—, are more or less blocked by the tanning agent. The products obtained are harder and not as plastic as those where an unhardened casein or protein is used.

A still further example of alcoholic halide or sulphate treatment is to use 10 kilograms of rennet-casein mixed with 2.5 kilograms of caustic soda which has been dissolved in from 15 to 25 liters of water. The mixing is continued until there is a completely homogeneous mass obtained. Thereupon 5 kilograms of ethyl sulphate are added by stirring the same in slowly. The complete mixture is to be heated to a temperature of about 65° C. and at the same time mixed and agitated. The reaction which takes place is of an exothermic character so that the temperature soon reaches 80° C. at which point it should be approximately held. The heating and agitating for a completion of the reaction takes from 3 to 5 hours. The contents produced is colorless and viscous, fairly well soluble in water and forms a gelatine with aqueous alcohols.

The same process immediately above appearing may be followed in the presence of formaldehyde in the proportion of 50 parts of the formaldehyde at 30% strength to 100 parts of casein. Likewise casein or other proteins may be used which have been subjected to a tanning or hardening operation. But in such case the reaction is less pronounced in violence, the product obtained is less viscous and less soluble in water and in the various organic solvents.

The ways disclosed of treating the casein or other protein with an alcoholic sulphate or halide produce a solid thermoplastic composition at ordinary atmospheric temperatures and, particularly in the first example given, it is clear, transparent and without discolorations. But in all cases the products obtained are thermoplastic and may be pressed under hydraulic pressure into molds and subjected to the application of heat and be very useful as a thermoplastic powder in injection molding, for best results using a softening agent or plastifier. The discolorations produced in the product in the second example given are objectionable for some purposes but are not for others.

Having thus fully described my invention, what I desire to claim and secure by Letters Patent is:

1. The herein described process which consists, in intermixing an acid casein and an alkali carbonate, an ethyl alcohol of approximately 80 to 85% purity, the remainder being principally water, and ethyl sulphate, ageing said mixture at ordinary atmospheric or room temperatures and then stirring and heating said intermixed ingredients and maintaining the same at a temperature of approximately 80° to 85° C. and maintaining said mixing and temperatures until reactions are complete, evidenced by the production of a smooth, homogeneous liquid free of solid particles or masses.

2. The herein described process which consists, in intermixing an acid casein, an unhydrated alkali carbonate, ordinary denatured ethyl alcohol and ethyl sulphate in the approximate proportions of 20 parts by weight of casein, 7 parts by weight of the alkali carbonate, 18 parts by weight of alcohol and 10 parts by weight of ethyl sulphate, ageing said mixture for a period of approximately 15 hours at ordinary atmospheric temperatures and then stirring and heating said intermixed ingredients to a temperature approximately 80° to 85° C. and maintaining the mixing and temperature for a period of approximately 3 to 5 hours or until reactions are complete.

3. A thermoplastic composition of matter provided by the reaction upon sulphuric casein of ethyl sulphate in the presence of ethyl alcohol and a relatively weak alkali salt, the acid radical of which is weaker than the acid radical of the casein.

JEAN DELORME.